(No Model.)

E. G. ACHESON.
CALELECTRIC GENERATOR.

No. 407,763. Patented July 30, 1889.

Witnesses
Jno. G. Hinkel Jr.
S. L. Johnson

Inventor
Edward G. Acheson,
By his Attorneys
Foster & Freeman.

UNITED STATES PATENT OFFICE.

EDWARD G. ACHESON, OF PITTSBURG, PENNSYLVANIA.

CALELECTRIC GENERATOR.

SPECIFICATION forming part of Letters Patent No. 407,763, dated July 30, 1889.

Original application filed April 16, 1889, Serial No. 307,481. Divided and this application filed June 13, 1889. Serial No. 314,686. (No model.)

*To all whom it may concern:*

Be it known that I, EDWARD G. ACHESON, a citizen of the United States, residing at Pittsburg, in the county of Allegheny and State of Pennsylvania, have invented certain new and useful Improvements in Calelectric Generators, of which the following is a specification, the present application being a division of another application filed by me April 16, 1889, Serial No. 307,481.

My invention has for its object the generation of electricity from heat, or the conversion of heat energy directly into electric energy, or the adding of electric energy to a current already existing and independently generated; and my invention consists in the apparatus for carrying out this object, substantially as hereinafter set forth.

In my patent, No 375,408, dated December 27, 1887, I describe and claim a method of converting heat energy into electric energy, consisting in causing heat-lines to traverse an electric conductor and produce a magnetic whirl cutting said heat-lines, and thereby convert the heat energy into electric energy, and my present invention may be said to be an improvement upon the broad idea therein set forth and the carrying forward of that invention by means of other apparatus.

Figure 1:
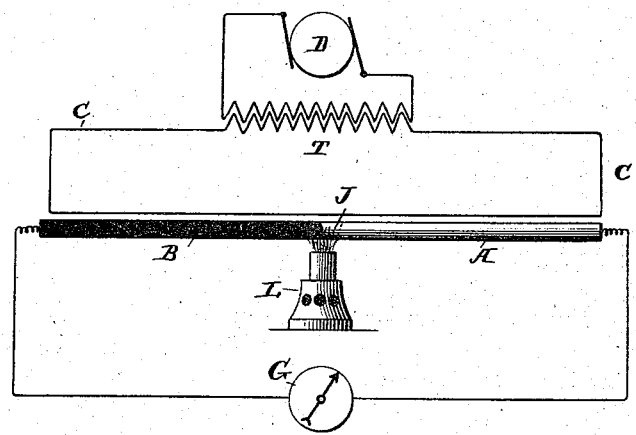
Figure 2:
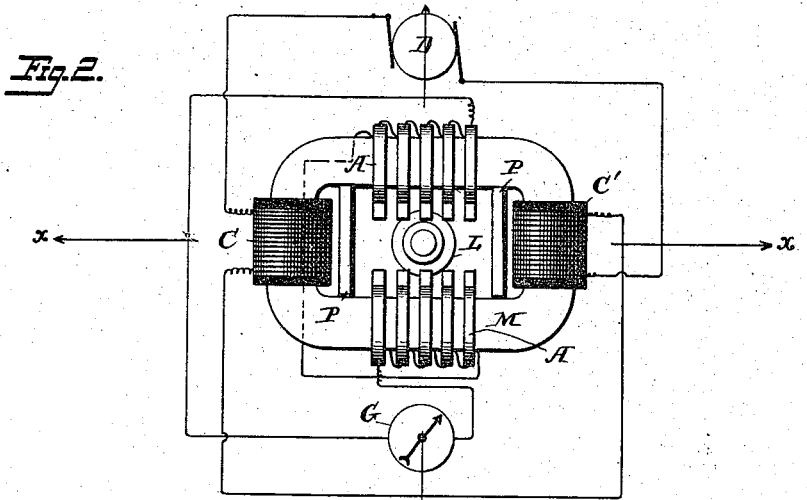
Figure 3:
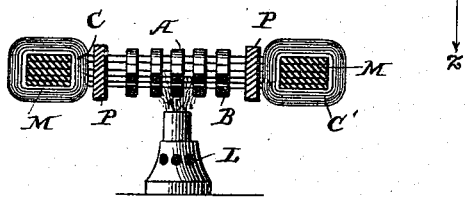
Figure 4:
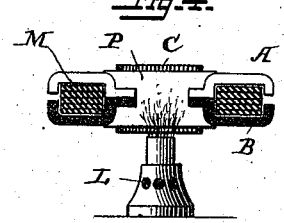

In the accompanying drawings I have shown so much of one embodiment of my invention as is necessary to a clear understanding of the principles and operation thereof, and in these drawings Figure 1 is a diagrammatic illustration of one construction that embodies the principles of generation or conversion. Fig. 2 is a plan view showing one form of apparatus which I have found convenient to use. Fig. 3 is a cross-section of Fig. 2 through the line $x\,x$, and Fig. 4 is a similar cross-section of Fig. 2 through the line $z\,z$.

My present invention is based, primarily, upon the discovery that if the two elements forming a thermo-couple be so situated as to be within the influence of lines of magnetic force, while at the same time heat-currents are traversing them, there will be a conversion of the heat-currents, or a portion thereof, as a result of the presence of the lines of magnetic force, and a current of electricity will be produced of a value greater than that due to the ordinary thermo-current or the sum of that current and any current resulting from induction.

Referring to the diagram illustrated in Fig. 1, D is an alternating-current dynamo or other similar suitable source of electricity. T represents a transformer, and C C the circuit closing the terminals of the transformer, a portion of which circuit is parallel with and adjacent to the two elements A B, forming a thermo-couple. Arranged in proper relation to this couple is a source of heat L, as a lamp or other suitable means, and in the circuit of the couple is a translating device G, which may be of any suitable kind, being represented in the present instance as a galvanometer.

I find that if the source of heat L is removed and an alternating current is caused to pass through the circuit C C by means of the generator D and transformer T, the translating device G in the circuit of the thermo-couple will show that a current or currents of a certain definite value are circulating in said circuit composed of the elements A B and the conducting-wire. Again, I find that when the generator D and transformer T are removed electrically and no alternating currents are used in the circuit C C, upon approaching the point of junction J of the thermo elements with a source of heat, as a lamp, a current of another certain definite value is generated and is indicated upon the translating device G. Now, when both of these functions are produced together—that is, when the generator D is run and the transformer T is operated and alternating currents are produced thereby in the circuit C C, and the heat is at the same time applied, at the point of junction J of the thermo-couple—a much larger amount of energy is exhibited in the translating device G and circulates through the circuit thereof than would be produced as the sum of the two former values. This extra energy, thus demonstrated as being produced by the conjoint operations, is to be attributed to a conversion of a portion of the heat energy that was applied at J into electric energy, and the amount of this conversion will, to a great extent, depend upon the particular form and proportion of the apparatus made use of. In the primitive form indicated in the sketch I have obtained definite results; but in the form indicated in the remaining figures of the drawings, as well as in other forms which I have not deemed necessary to illustrate, I have obtained more pronounced results.

In the remaining figures, M represents a core of iron, solid or built up of plates or wire, as may be desired. C C' are coils of wire corresponding to the circuit C of Fig. 1, through which coils the currents produced by the generator D are sent and which are used to magnetize the core M. In the present instance these coils C C' are shown connected in series, although they may be otherwise connected, as is well known. Arranged upon this core, and preferably upon opposite sides thereof, are the elements A B, forming the thermo-couples, and they are placed so as to embrace the core and have their points of junction J adjacent to each other within the limits of the core. These couples are shown as connected in series in order to get the strongest effects, the positive element of one couple being connected to the negative element of the next couple.

The source of heat L is arranged midway between the sets of couples, so as to direct the heat upon the points of junction of the couples. I have found it convenient in this construction to make use of partitions P, of non-heat-absorbing material, to aid in applying and directing the heat-currents to the thermo elements. The translating device G is connected in circuit with the thermo elements. It will be understood that in this arrangement, when an alternating or intermitting current is caused to traverse the coils C C', there will be produced reversals or variations in the magnetism of the core M, and this will cause lines of magnetic force to cut the elements A B of the thermo-couples, and therefore the currents of heat flowing through them. This cutting produces a conversion of the heat-currents into electric energy, and this energy is added to or superposed upon the energy produced by the other sources of electric energy, as above stated.

It will be understood that I do not wish to limit myself to the specific construction of the devices shown, as many forms and arrangements may be made use of, and, as will be understood, the conversion of heat energy into electric energy may be performed at the same time and with the same apparatus that is used to change or alter the potential, as in the ordinary transformers; such a construction as I have shown in Figs. 2, 3, and 4 being suitable for accomplishing both purposes.

I have not described any specific thermo-couples, as my experience shows that any of the ordinary elements may be used in the generator without change in the kind of results.

I do not wish to limit my invention to the use of an outside or primary generator, as indicated in the drawings, although to the present time the best results have been obtained by such use.

What I claim is—

1. The combination, with an electric conductor through which varying electric currents are passed, of a thermo-couple arranged in inductive relation to said conductor and a source of heat for said couple, substantially as described.

2. The combination, with an electric conductor, of a core energized thereby, thermo-couples arranged in inductive relation to said core, and a source of heat for said couples, substantially as described.

In testimony whereof I have signed my name to this specification in the presence of two subscribing witnesses.

EDWARD G. ACHESON.

Witnesses:
PETER CARR,
M. F. CASSIDY.